United States Patent [19]
Nelson

[11] 3,860,025
[45] Jan. 14, 1975

[54] SHUT-OFF VALVE ASSEMBLY WITH FRANGIBLE BODY SECTION

[75] Inventor: Lowell F. Nelson, Muskegon, Mich.

[73] Assignee: Enterprise Brass Works, Muskegon, Mich.

[22] Filed: Feb. 4, 1974

[21] Appl. No.: 439,023

Related U.S. Application Data

[62] Division of Ser. No. 277,692, Aug. 3, 1972, Pat. No. 3,811,456.

[52] U.S. Cl. .................................. 137/68, 285/4
[51] Int. Cl. ..................... F16k 17/36, F16l 35/00
[58] Field of Search ............ 285/2, 3, 4; 137/68, 71, 137/272, 294, 797

[56] References Cited
UNITED STATES PATENTS

| | | | |
|---|---|---|---|
| 1,390,664 | 9/1921 | Bassett | 285/2 X |
| 1,458,965 | 6/1923 | Bassett | 285/2 X |
| 2,305,377 | 12/1942 | Corey | 285/2 |
| 2,893,423 | 7/1959 | Seney | 251/333 X |
| 3,542,045 | 11/1970 | Kruckeberg | 137/39 |
| 3,542,047 | 11/1970 | Nelson | 137/68 |

Primary Examiner—Martin P. Schwadron
Assistant Examiner—Richard Gerard
Attorney, Agent, or Firm—McGlynn and Milton

[57] ABSTRACT

A temperature and impact responsive shut-off valve assembly including a housing having an upper first section and a lower second section with the upper section having three ears through which bolts extend for securing the two sections together and including a circular O-ring seal groove adjacent the ears for establishing a weakened break-away means to allow a body portion of the upper first section of the assembly to separate from the ears and the lower section of the valve. A valve is supported on a shaft in the lower second section of the assembly for movement between open and closed positions, the closed position being one wherein a plastic valve member engages a valve seat in the lower second section. The valve is held in the open position, by a metallic spring strip secured to the body portion of the upper first section and engaging an arm which is secured to a shaft which in turn rotates for moving the valve member between the open and closed positions. A pin extends from the metallic spring strip into a hole in the arm and the spring strip is inherently biased to move the pin out of the hole of the arm so that upon oscillating movement of the arm, the spring strip will disengage the arm allowing the valve member to move to the closed position under the biasing action of a coil spring disposed about the shaft which supports the valve member. Adjacent the spring strip are a pair of metallic strips having different coefficients of thermal expansion for moving the spring strip out of engagement with the arm to allow the valve member to move to the closed position in response to a predetermined temperture. Additionally, the valve seat has a periphery defined by a pointed edge with a recess immediately adjacent thereto for engaging the plastic material of the valve member preventing the extrusion thereof past the valve seat.

9 Claims, 3 Drawing Figures

PATENTED JAN 14 1975　　3,860,025

SHUT-OFF VALVE ASSEMBLY WITH FRANGIBLE BODY SECTION

This application is a divisional of application Ser. No. 277,692, filed Aug. 3, 1972, now U.S. Pat. No. 3,811,456.

This invention relates to a shut-off valve assembly having a valve seat and a valve means movable between open and closed positions and normally held in the open position but movable to the closed position in response to a predetermined impact and/or a predetermined temperature.

Although valves of this type may be used in various environments they have particular utility as emergency shut-off valves in gasoline supply lines such as those utilized in dispensing systems at gasoline filling stations.

There are various shut-off valve assemblies known in the prior art for automatically closing in response to a predetermined impact or in response to a predetermined temperature.

One manner in which the impact function is accomplished in prior art shut-off valve assemblies is to utilize an integral housing having first and second sections which are integrally connected together but are divided by a groove providing a weakened portion so that the two sections shear or fracture at the groove so as to separate from one another in response to a predetermined impact force. The problem with accomplishing the impact feature in this manner is that once the valve housing has been fractured into two sections, at least the part of the valve which has been fractured is no longer usable and must be replaced. In order to overcome this deficiency applicant developed a valve utilizing a housing having two independent sections connected together by shearable bolts whereby the bolts fracture in response to a predetermined force; thus, allowing the housing sections to be reunited by new bolts. Although this feature works very well it is susceptible to improper adjustment in the field in that it is possible for the two housing sections to be reconnected with shearable bolts in the field in such a manner that too much tension is applied to a shearable bolt thereby prematurely fracturing the bolts.

In order to obtain the automatic closing function of such a shut-off valve assembly in response to a predetermined temperature, many of the prior art shut-off valve assemblies utilize a fusible link to hold the valve means in the open position with the link incorporating or comprising fusible material. The problem with utilizing a fusible material to accomplish this function is that the material is consumed or destroyed and must be replaced in the event the valve closes in response to a predetermined temperature. An alternative manner of accomplishing this function is to utilize a bimetallic link which normally holds the valve means in the open position but which moves in response to a predetermined temperature to disengage the valve means thereby allowing the valve means to move to the closed position. Typically in a valve assembly utilizing a bimetallic link the bimetallic link is connected at one end to the housing and engages the valve means at the other end by abutting the valve means in a manner so as to be placed in compression when holding the valve means in the open position. Although such an assembly works very satisfactorily, the bimetallic link can be responsive to ambient temperature changes which affect the degree of engagement by bimetallic link with the valve means.

In accordance with the instant invention an improved shut-off valve assembly is provided wherein the impact feature is attained by a housing having two independent sections with one section having ears connected to the other section by fastening means and with weakened break-away means between the ears and the remainder of the section whereby the remainder of the section may fracture and break-away from the ears and the other section. Such an assembly allows a new section with ears to be associated with the remaining section of the valve assembly after an impact without requiring an entirely new valve assembly yet avoiding the problem of over or under torquing shearable bolts. The temperature responsive feature of the improved valve assembly of the instant invention is attained by the use of a latch means normally holding the valve in the open position and movable for disengaging the valve means so that it may move to the closed position and heat responsive means for moving the latch means out of engagement with the valve means in response to a predetermined temperature whereby the latch means may be reset after being activated by the predetermined temperature and wherein the latch means is not responsive to ambient conditions in the same manner as bimetallic strips. As a further feature the latch means comprises a spring strip which is inherently biased out of engagement with the valve means whereby the strip will disengage the valve means upon oscillating movement of the valve means.

Yet another feature of the valve assembly of the instant invention is the provision of a valve member made of yieldable material such as plastic for engaging a valve seat which has a sharp edge defining its periphery with a recess immediately adjacent thereto for preventing extrusion or movement of the yieldable material past the valve seat which in turn prevents leakage.

Other objects and attendant advantages of the present invention will be readily appreciated as the same becomes better understood by reference to the following detailed description when considered in connection with the accompanying drawings wherein.

Figure 1:
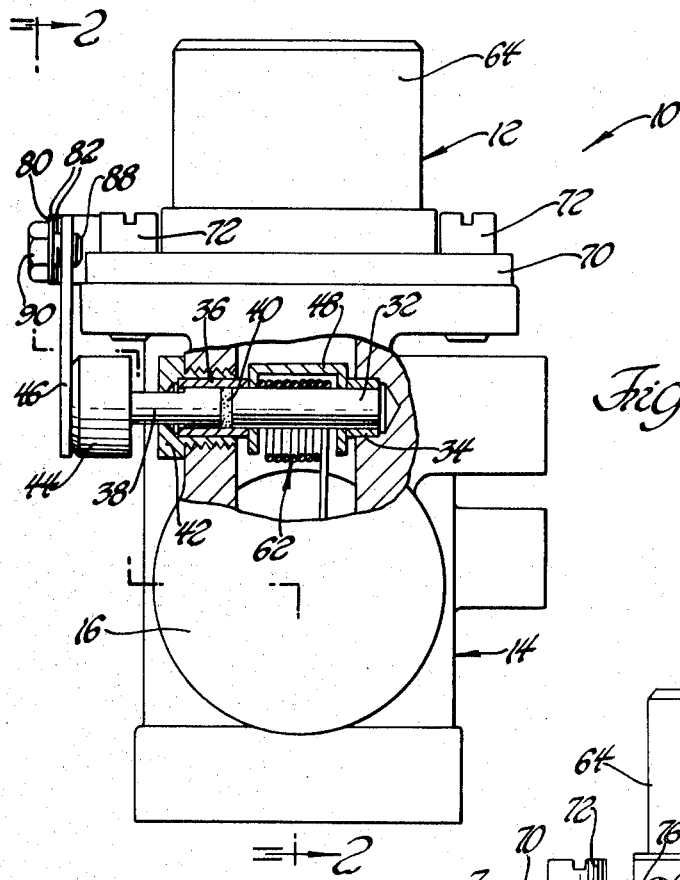
FIG. 1 is an elevational view partially broken away and in cross-section of a preferred embodiment of the instant invention.

Referring now to the drawings wherein like numerals indicate like parts throughout the several views a shut-off valve assembly constructed in accordance with the instant invention is generally shown at 10. The valve assembly 10 includes a housing comprising an upper first section generally indicated at 12 and a lower second section generally indicated at 14. The housing sections 12 and 14 are generally circular with a passage extending therethrough. The second or lower section 14 includes an outwardly protruding pocket 16 and a valve means generally shown at 18 is disposed in the pocket 16 when in the open position as shown in full lines in FIG. 2. The lower section 14 includes the threads 20 for adapting the lower section 14 for connection to a fluid system.

The lower section 14 includes a passage 22 with a plug 24 threadedly disposed therein so that the plug 24 may be removed and the system in which the valve 10 is disposed pressurized to check for leakage. To prevent the unauthorized removal of the plug 24 (i.e., to prevent the unauthorized extraction of fluid from the system) the plug 24 includes a hole 26 and the housing section 14 includes a hold 28 through which a seal means such as a wire may be disposed.

Figure 2:
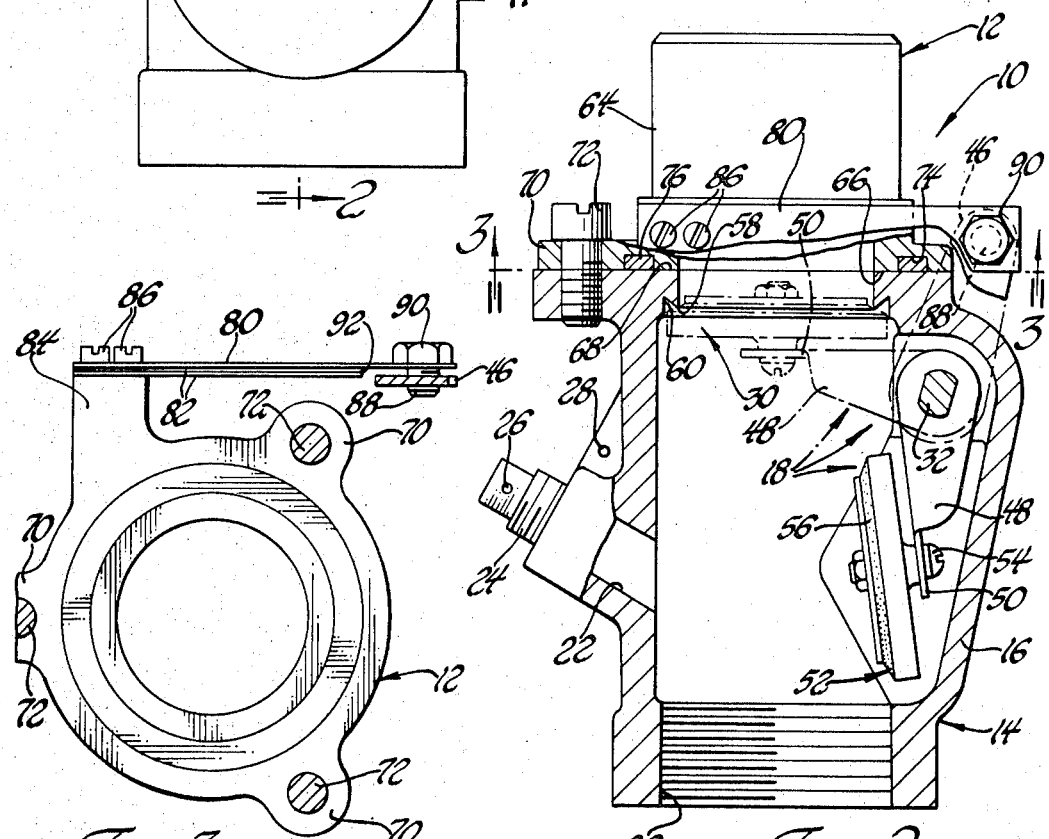
FIG. 2 is a fragmentary cross-sectional view taken substantially along line 2—2 of FIG. 1.

The lower section 14 also includes a valve seat generally indicated at 30 and the valve means 18 is operatively supported within the lower section 14 of the housing for movement between an open position as shown in full lines of FIG. 2 and a closed position in seating engagement with the valve seat 30 as shown in phantom in FIG. 2.

The valve means 18 includes a shaft 32 rotatably supported in the second or lower section 14 of the housing. The shaft 32 is rotatably supported by the bushings or bearings 34 and 36 and has an end 38 extending exteriorly of the lower section 14 of the housing. At least one of the bushings or bearings 34 and 36 is made of a TEFLON bronze combination of approximately 40% TEFLON and 60% bronze. Such a combination prevents freeze up of the shaft as by rusting or the like. There is also included an O-ring seal 40 disposed about the shaft 32 to prevent leakage. A threaded plug 42 is disposed about the bearing or bushing 36 and threadedly engages the lower section 14 of the housing.

A connector member 44 is disposed about the outward end 38 of the shaft 32 and conforms to the irregular shape of the end 38 of the shaft 32 to prevent relative rotation therebetween. And arm 46 is fixedly secured to the connector member 44 and extends radially from the end 38 of the shaft 32 exteriorly of the housing.

The valve means 18 further includes a support member 48 extending from the shaft 32 to a distal end 50. The support member 48 is disposed within the lower section 14 of the housing. The support member 48 is non-rotatably connected to the shaft 32 so as to rotate therewith. A valve member generally indicated at 52 is supported at the distal end 50 of the support member by a bolt 54. The valve member 52 includes or at least has a face made of a yieldable material such as plastic as indicated by the numeral 56 in FIG. 2. The valve member 52 is circular and the valve seat 30 includes a circular or annular sharp edge 58 defining its periphery with a recess 60 immediately adjacent to the sharp edge 58 for receiving the plastic or yieldable material 56 of the valve member 52 when the latter is in the closed position illustrated in phantom in FIG. 2. As is clear from FIG. 2 the edge 58 is pointed as is the recess 60, the recess 60 having one wall extending upwardly and laterally away from the edge 58 and a second wall extending generally downwardly from the bottom of the recess. In the event the valve means is in the closed position and a great deal of pressure urges the valve member 52 to the closed position the sharp edge 58 prevents the plastic material 56 of the valve member 52 from extruding or moving past the valve seat 30 thereby effecting an excellent seal.

The assembly also includes a biasing means comprising the coil spring generally indicated at 62 in FIG. 1 and disposed about the shaft 32 for urging the valve means 18 to the closed position.

The first or upper section 12 of the housing is completely independent of the lower section 14 and has a body portion 64 having a seating surface 66 for seating engagement with a seating surface 68 of the second or lower section 14 and a plurality of ears 70 disposed about the body portion 64. The body portion 64 is adapted to be connected to a component of a fluid system as by being externally or internally threaded. Fastener means comprising the bolts interconnect the ears 70 and the lower or second section 14 for maintaining the seating surfaces 66 and 68 in engagement with one another. The bolts 72 extend through holes in the ears 70 and threadedly engage a flange in the lower section 14.

Figure 3:
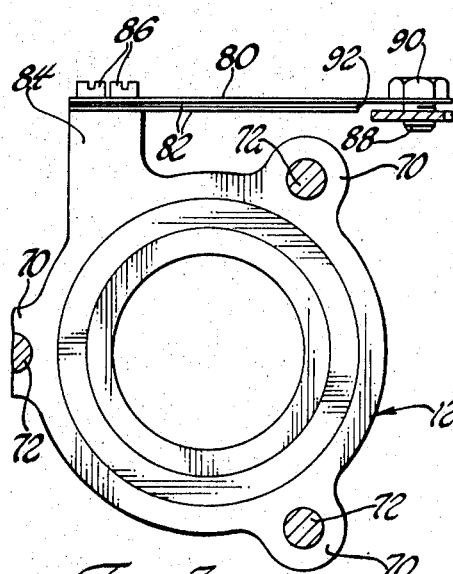
FIG. 3 is a cross-sectional view taken substantially along line 3—3 of FIG. 2.

There is also included weakened breakaway means between the ears 70 and the body portion 64 of the first or upper section 12 for allowing the body portion 64 to separate from the ears 70 and the second or lower section 14 in response to a predetermined impact force. More specifically, the weakened break away means comprises a groove 74 between each ear 70 and the body portion 64. As best illustrated in FIG. 3 the ears 70 are disposed on a circle and the groove 74 is circular and concentric to the circle on which the ears 70 are disposed. The bolts 72 have their centers on the circle on which the ears 70 are disposed. The groove 74 extends into the body portion 64 from the seating surface 66 and an O-ring seal 76 is disposed in the groove for effecting a seal between the upper and lower sections 12 and 14. Thus, the metal between the bottom of the groove 74 and the top of the ears 70 provides a weakened breakaway means allowing the body portion 64 to breakaway from the ear 70 in response to a predetermined impact force. Once the emergency has passed a new upper section 12 may be bolted to the lower section 14.

In the preferred embodiment, the body portion 64 breaks away from the ears 70 when subjected to an impact force which is at or below 600 pounds. Additionally, the section 12 is integral and made of metal having a nominal tensile strength of 30,000 psi. An example of such material is class 30 gray iron. Furthermore, in the preferred embodiment the ears 70 are between 0.209 and 0.229 inch thick and the groove 74 is between 0.110 and 0.115 inch deep.

The assembly 10 also includes temperature responsive means normally holding the valve means 18 in the open position and movable in response to heat for allowing the valve means 18 to move to the closed position when subjected to predetermined temperature. More specifically, the temperature responsive means includes a latch means comprising a flexible metal spring member or strip 80 engaging the valve means 18 to hold the valve means 18 in the open position and movable for disengaging the valve means 18 so that the valve means 18 moves to the closed position. Additionally, the temperature responsive means includes the metallic strips 82 defining a bimetallic strip for moving the spring strip 80 out of engagement with the valve means 18 in response to the predetermined temperature to allow the valve means 18 to move to the closed position.

The upper section 12 includes a projection 84 and the spring strip 80 along with the metallic strips 82 are secured thereto by the bolt 86.

The distal end of the spring strip 80 supports a pin 88 which in turn extends through a hole in the arm 46, the pin being held in place by a nut 90. The metallic strips 82 are shorter than the spring strip 80 and terminate at the ends 92. The spring strip 80 is secured to the upper section 12 of the housing at one end by the bolts 86 and at its distal end engages the arm 46 through the pin 88 and as the spring 62 urges the valve member 52 to rotate toward the closed position the arm 46 is urged to rotate in a clockwise direction thereby placing the spring strip 80 in tension. The placing of the spring strip 80 in tension is benificial as compared to having the end of such a strip abut a pin in the valve means wherein the end of the strip might dig into the pin.

The spring strip 80 is bent so as to be biased out of engagement with the valve means for disengaging the valve means in response to movement thereof. More specifically, the spring strip 80 is bent outwardly so as to urge the pin 88 to disengage the aperture in the arm 46 whereby upon a slight impact on the valve assembly sufficient to oscillate the support member 48 in a rotary fashion, the spring strip 80 will disengage the pin 88 thereby allowing the valve means 18 to close.

The metallic strips 88 have different coefficients of thermal expansion whereby they move or bend when subjected to a predetermined temperature. The metallic strips are disposed adjacent the spring strip 80 to move the spring strip 80 or the pin 88 thereof out of engagement with the arm 46 of the valve means as the metallic strips move in response to a predetermined temperature. Thus, the spring strip 80 being made of a spring steel is not subjected to the ambient temperature conditions that metallic strips 82 may be subjected to yet the advantage of utilizing metallic strips having different coefficients of thermal expansion so that they may be reset is maintained.

It will be noted that the spring strip 80 is secured to the body portion 64 of the upper section 12 so that it disengages the arm 46 when the body portion 64 is separated from the ears 70 and the second or lower section 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. In an improved shut-off valve assembly of the type including a housing having first and second sections which separate in response to a predetermined force to allow a valve member to move to a closed position, the improvement comprising: said first and second sections being independent of one another; said first section having a body portion including a seating surface for seating engagement with said second section, a plurality of ears disposed about said body portion; fastener means interconnecting said ears and said second section for maintaining said seating surface of said first section in said seating engagement with said second section; and weakened breakaway means between said ears and said body portion of said first section for allowing said body portion to separate from said ears and said second section in response to a predetermined force, said weakened breakaway means comprising groove means extending into said first section from said seating surface and disposed between each ear and said body portion, and seal means disposed in said groove means for effecting a seal between said sections.

2. An assembly as set forth in claim 1 wherein said ears are disposed on a circle and said groove means adjacent each ear is concentric to said circle.

3. An assembly as set forth in claim 2 wherein said means comprises a circular groove.

4. An assembly as set forth in claim 3 wherein said seal means comprises a circular seal disposed in said groove.

5. An assembly as set forth in claim 4 wherein said ears break away from said body portion when said predetermined force is at and below 600 foot-pounds.

6. An assembly as set forth in claim 5 wherein said first section is an integral member made of metal having a nominal tensile strength of 30,000 p.s.i.

7. An assembly as set forth in claim 6 wherein said ears are between 0.209 and 0.229 inch thick and said groove is between 0.110 and 0.115 inch deep.

8. An assembly as set forth in claim 7 wherein each of said ears has a hole therethrough and said fastener means includes a bolt extending through each hole.

9. An assembly as set forth in claim 8 wherein each of said bolts threadedly engage said second section.

* * * * *